United States Patent
Bennetts

[11] 3,775,892
[45] Dec. 4, 1973

[54] FISHING LURE
[76] Inventor: John F. Bennetts, Antigo, Wis.
[22] Filed: Apr. 27, 1972
[21] Appl. No.: 247,996

[52] U.S. Cl. .............................. 43/42.14, 43/42.2
[51] Int. Cl. .......................................... A01k 85/00
[58] Field of Search .............. 43/42.14, 42.2, 42.17, 43/42.19

[56] References Cited
UNITED STATES PATENTS
2,610,429  9/1952  Thomas ........................... 43/42.17
3,095,664  7/1963  Nichols ............................ 43/42.19

Primary Examiner—Louis G. Mancene
Assistant Examiner—Robert F. Cutting
Attorney—Joseph G. Werner et al.

[57] ABSTRACT

A fishing lure assembly having a pair of blades diagonally twisted in opposed directions and attached to an elongate shaft by rotatable clevises. When the lure is pulled through the water the blades rotate in opposite directions about the axis of the shaft. A graduated pair of beads received on the shaft rearwardly of each attaching clevis to cause the oppositely directed blade rotation to take place in close proximity to a body form toward the rear of the shaft. A spacer element is fixedly attached to the shaft between the blades for maintaining the blades in spaced relation during use.

1 Claim, 4 Drawing Figures

PATENTED DEC 4 1973

3,775,892

FISHING LURE

BACKGROUND OF THE INVENTION

This invention relates generally to fishing lures and more particularly to lures, commonly known as "spinners."

Known spinners generally consist of a wire shaft with a double or treble hook attached at the rear end of the shaft. A plurality of metal or brightly colored beads and a body form are mounted on the shaft. A flat or slightly dished willow-leaf shaped blade is rotatably attached by a clevis mounted on the shaft forwardly of the beads and body form. As the lure is pulled through the water the willow-leaf blade spins about the lure which tends to spin the lure and twist the fishing line.

SUMMARY OF THE INVENTION

My invention is a spinner type fishing lure having oppositely rotating spinner blades. The blades are diagonally bent in opposed directions to impart rotation in opposite directions about the axis of the shaft of the lure.

The front portions of the blades ride on bearing beads received on the lure shaft rearwardly of the attaching clevis for each blade.

A smaller bead between each clevis and bearing bead maintains the anchor point of the blades out away from the shaft and causes the front portions of the blades engaging the bearing beads to extend generally along the side of the shaft while the rear portions flare diagonally outward to impart rotation to the blades in close proximity to the shaft body form of the lure to resemble a bug flipping its wings in the water.

Because of the rotation of the spinner blades in opposite directions, the fishing line does not twist as it tends to do with single bladed spinners or multi-bladed spinners where the spinners all rotate in the same direction.

The spacer element is fixedly mounted on the shaft of the lure for maintaining the oppositely rotating spinner blades in spaced relation with one another during use.

Further objects, features and advantages of my invention will be apparent from the following detailed description taken in conjunction with the accompanying drawings wherein a preferred embodiment of the invention is shown for exemplification.

DESCRIPTION OF A PREFERRED EMBODIMENT

Figure 1:
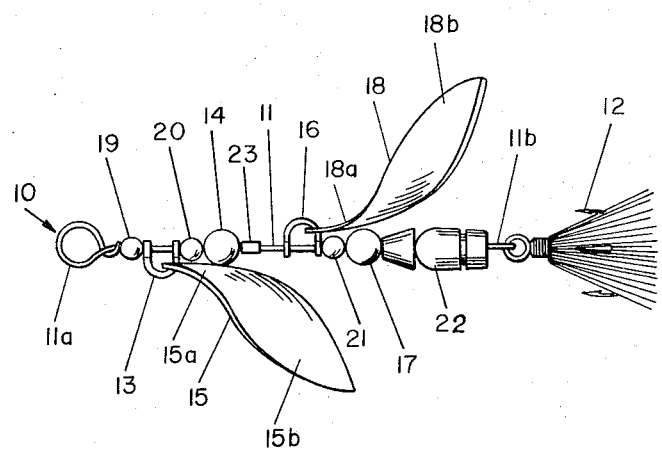
FIG. 1 is a side view of a fishing lure embodying the principles of my invention.
Figure 2:
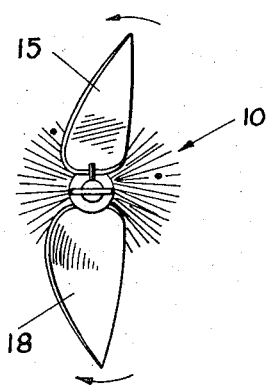
FIG. 2 is a fron end view of the fishing lure shown in FIG. 1.

Referring now more particularly to the drawings wherein like numerals refer to like parts throughout the several views, an exemplary embodiment of my fishing lure invention is generally shown at 10 in FIGS. 1 and 2. The lure has an elongate wire shaft 11 have its front end twisted to form a line eyelet 11a and its rear end twisted to form a hook eyelet 11b. A hook unit, such as the treble hook 12 shown, is attached to the hook eyelet in the usual manner.

A first clevis 13 is mounted on the shaft for rotation about the axis of the shaft. A first bearing bead 14 is received on the shaft rearwardly of clevis 13. A first non-planar spinner blade 15 having integral front and rear portions, 15a and 15b, is attached to clevis 13 for rotation about the axis of the shaft.

As best shown in FIG. 1, the front portion 15a of blade 15 extends rearwardly generally along the side of the shaft and rides on bearing bead 14 when the lure is pulled forwardly through the water. The rear portion 15b of blade 15 is diagonally disposed with respect to front portion 15a and extends diagonally away from the shaft to impart rotation to the blade about the axis of the shaft when the lure is pulled forwardly through the water.

A second clevis 16 is mounted on the shaft rearwardly of bearing bead 14 for rotation about the axis of the shaft. A second bearing bead 17 is received on the shaft rearwardly of clevis 16.

A second non-planar spinner blade 18 having integral front and rear portions, 18a and 18b, is attached to clevis 16 for rotation about the axis of the shaft. In the same manner as blade 15, the front portion 18a of blade 18 extends rearwardly generally along the side of the shaft and rides on the second bearing bead 17 when the lure is pulled forwardly through the water. The rear portion 18b of blade 18 is also diagonally disposed with respect to its front portion, however, in an opposed direction with respect to the rear portion 15b of blade 15. The rear portion 18b of blade 18 extends diagonally away from the shaft to impart rotation to blade 18 about the axis of the shaft in a direction counter to blade 15 when the lure is pulled forwardly through the water.

The opposed rotation of blades 15 and 18 is depicted by the directional arrows in FIG. 2. The oppositely rotating blades prevent the shaft of the lure from rotating and thus eliminates any tendency to twist the fishing line.

Figure 3:
FIG. 3 is an isometric view of one of the spinning blades for my fishing lure, the other blade being similar except that it is bent for rotation in the opposite direction.
Figure 4:
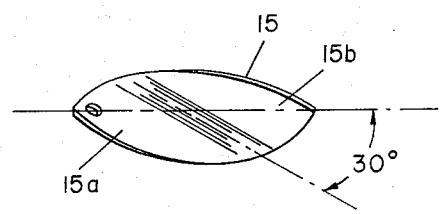
FIG. 4 is a plan view of the spinner blade shown in FIG. 3 depicting the approximate 30° diagonal bend line, the bend line on the other blade laying approximately 30° on the other side of the longitudinal axis of the blade.

The spinner blades 15 and 18 are made from the well-known dished willow-leaf shaped blades by making a diagonal bend into the convex side of the original dished pattern at an angle of about 30° to the longitudinal axis of the blade as shown in FIGS. 3 and 4. The angle can vary from about 20° to about 40°, however, an angle of 30° has been found to be most suitable. The direction of the angle from the blade axis determines the direction of spin of the blade; in the one blade shown in FIG. 4 the angle being to the right of the blade axis, in the other blade it being to the left.

The bearing beads 14 and 17 are preferably made of brightly colored plastic for high visibility. These beads are rotatable on the shaft.

A small, preferably metal, spacer bead 19 is mounted on the shaft between the line eyelet 11a and the first blade clevis 13 to prevent the clevis from being caught on the twist portion of the line eyelet.

In addition, a pair of beads, 20 and 21, which are smaller than the bearing beads are also mounted on the shaft. The first bead 20 is positioned between clevis 13 and bearing bead 14 and the second bead 21 is positioned between clevis 16 and bearing bead 17. The graduated bead arrangement following each clevis keeps the anchor point of the blades out away from the shaft and allows the front portion of the blades riding on the bearing beads to assume a position substantially parallel to the shaft which in turn produces rotation in close proximity to the shaft and body form 22 of the lure.

A spacer element 23, preferably in the form of a crimp or solder droplet as shown in FIG. 1, is fixedly attached to the shaft between bearing bead 14 and clevis 16 for maintaining the oppositely rotating spinner blades in spaced relation during use.

It should be understood that my invention is not confined to the particular construction and arrangement of parts herein illustrated and described, but embraces all such modified forms thereof as come within the scope of the following claims.

I claim:
1. A fishing lure assembly comprising:
   a. an elongate shaft having a line eyelet at its front end and a hook eyelet at its rear end,
   b. a first clevis mounted on said shaft for rotation about the axis of said shaft,
   c. a first spacer bead received on said shaft rearwardly of said first clevis and having a substantially smaller radius than said first clevis,
   d. a first bearing bead received on said shaft rearwardly of said first spacer bead, said first bearing bead being substantially larger than said first spacer bead,
   e. a first non-planar spinner blade having integral front and rear portions, said first blade being attached to said first clevis at said front portion for rotation about the axis of said shaft, said front portion of said blade extending rearwardly substantially parallel to said shaft and riding on said first bearing bead when the lure is pulled forwardly through the water, said rear portion of said blade being diagonally disposed with respect to its front portion and extending diagonally away from said shaft to impart rotation to said blade about the axis of said shaft when the lure is pulled forwardly through the water,
   f. a second clevis mounted on said shaft rearwardly of said first bearing bead for rotation about the axis of said shaft,
   g. a second spacer bead received on said shaft rearwardly of said second clevis and having a substantially smaller radius than said second clevis
   h. a second bearing bead received on said shaft rearwardly of said second spacer bead, said second bearing bead being substantially larger than said second bearing bead, and
   i. a second non-planar spinner blade having integral front and rear portions, said second blade being attached to said second clevis at said front portion for rotation about the axis of said shaft, said front portion of said second blade extending rearwardly substantially parallel to said shaft and riding on said second bearing bead when the lure is pulled forwardly through the water, said rear portion of said second blade being diagonally disposed with respect to its front portion and being in opposed diagonal relation to the rear portion of said first blade and extending diagonally away from said shaft to impart rotation to said second blade about the axis of said shaft is a direction opposite to said first blade when the lure is pulled forwardly through the water.

* * * * *